United States Patent
Kim

(10) Patent No.: US 12,049,269 B2
(45) Date of Patent: Jul. 30, 2024

(54) STEERING CONTROL DEVICE AND METHOD

(71) Applicant: HL MANDO CORPORATION, Gyeonggi-do (KR)

(72) Inventor: Tae Sik Kim, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 252 days.

(21) Appl. No.: 17/856,783

(22) Filed: Jul. 1, 2022

(65) Prior Publication Data
US 2023/0182809 A1 Jun. 15, 2023

(30) Foreign Application Priority Data
Dec. 10, 2021 (KR) .......... 10-2021-0176930

(51) Int. Cl.
*B62D 6/00* (2006.01)
*H02P 3/18* (2006.01)
*H02P 27/06* (2006.01)

(52) U.S. Cl.
CPC ........... *B62D 6/00* (2013.01); *H02P 3/18* (2013.01); *H02P 27/06* (2013.01)

(58) Field of Classification Search
CPC ........ B62D 6/00; B62D 6/008; B62D 5/0466; B62D 5/0481; B62D 5/006; B62D 15/021; B62D 5/04; H02P 3/18; H02P 27/06; B60R 16/033
See application file for complete search history.

(56) References Cited

U.S. PATENT DOCUMENTS

| | | | |
|---|---|---|---|
| 2006/0200289 A1* | 9/2006 | Chino | .......... B62D 6/008 701/41 |
| 2023/0059965 A1 | 2/2023 | Nakakuki et al. | |

FOREIGN PATENT DOCUMENTS

DE  11 2021 000 847   12/2022

OTHER PUBLICATIONS

Office Action dated Jul. 18, 2023 for German Patent Application No. 102022209149.3 and its English machine translation by Google Translate.

\* cited by examiner

*Primary Examiner* — Rodney A Butler
(74) *Attorney, Agent, or Firm* — Womble Bond Dickinson (US) LLP

(57) ABSTRACT

The disclosure relates to a steering control device and method and includes a steering control device controlling a reaction force motor to generate a reaction torque in response to rotation of a steering wheel and comprising a condition determiner determining whether a stop reaction force providing condition is met, the stop reaction force providing condition including a preset vehicle stop condition and reaction force provision preparation condition, a producer discerning and processing a scheme for producing stop reaction torque information based on remaining power information regarding a remaining power amount of a battery supplying power to the reaction force motor upon determining that the stop reaction force providing condition is met, and a controller controlling to generate a reaction torque to the steering wheel based on the stop reaction torque information.

15 Claims, 10 Drawing Sheets

STEERING CONTROL DEVICE AND METHOD

CROSS-REFERENCE TO RELATED APPLICATION

This application claims priority from Korean Patent Application No. 10-2021-0176930, filed on Dec. 10, 2021, which is hereby incorporated by reference for all purposes as if fully set forth herein.

BACKGROUND

Field

The disclosure relates to a steering control device and method and, more specifically, to a steering control device and method for providing a reaction force to the steering wheel of a stopped vehicle.

Description of Related Art

In general, a vehicle steering device refers to a device that changes the traveling direction of the vehicle by applying the force from the driver to the wheels. A steering device which has an upper end and a lower end mechanically separated from each other and transfers the movement of the upper end by way of electrical signals, so-called steer-by-wire system, is recently adopted.

By the nature of the steer-by-wire system, if no reaction force is provided when the user manipulates the steering wheel, the vehicle may be moved at a velocity different from the velocity intended by the user or may idle, causing an accident.

In particular, when the vehicle is parked, the driver may think that the steering wheel is fixed and get in or out of the car while holding the steering wheel. Thus, even in the parked state, it is needed to provide a reaction force to the steering wheel.

However, if only a general scheme for providing a reaction force is used in the context where the vehicle system is off, the battery may be discharged. Thus, a need exists for a technique for providing a reaction force to fit each context, e.g., the remaining battery.

BRIEF SUMMARY

The disclosure provides a steering control device and method capable of providing a reaction force to the steering wheel even in the context where the vehicle is parked.

The disclosure also provides a steering control device and method capable of providing a reaction force to the steering wheel to fit each context considering the remaining battery capacity.

The disclosure also provides a steering control device and method capable of providing a reaction force to the steering wheel even when the magnitude of current capable of driving is low.

In an aspect, the present embodiments may provide a steering control device controlling a reaction force motor to generate a reaction torque in response to rotation of a steering wheel and comprising a condition determiner determining whether a stop reaction force providing condition is met, the stop reaction force providing condition including a preset vehicle stop condition and reaction force provision preparation condition, a producer discerning and processing a scheme for producing stop reaction torque information based on remaining power information regarding a remaining power amount of a battery supplying power to the reaction force motor upon determining that the stop reaction force providing condition is met, and a controller controlling to generate a reaction torque to the steering wheel based on the stop reaction torque information.

In another aspect, the present embodiments may provide a steering control method controlling a reaction force motor to generate a reaction torque in response to rotation of a steering wheel and comprising a condition determination step determining whether a stop reaction force providing condition is met, the stop reaction force providing condition including a preset vehicle stop condition and reaction force provision preparation condition, an information production step discerning and processing a scheme for producing stop reaction torque information based on remaining power information regarding a remaining power amount of a battery supplying power to the reaction force motor upon determining that the stop reaction force providing condition is met, and a stop reaction force control step controlling to generate a stop reaction torque to the steering wheel based on the stop reaction torque information.

According to the disclosure, there may be provided a steering control device and method capable of providing a reaction force to the steering wheel even in the context where the vehicle is parked.

According to the disclosure, there may also be provided a steering control device and method capable of providing a reaction force to the steering wheel to fit each context considering the remaining battery capacity.

According to the disclosure, there may also be provided a steering control device and method capable of providing a reaction force to the steering wheel even when the magnitude of current capable of driving is low.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
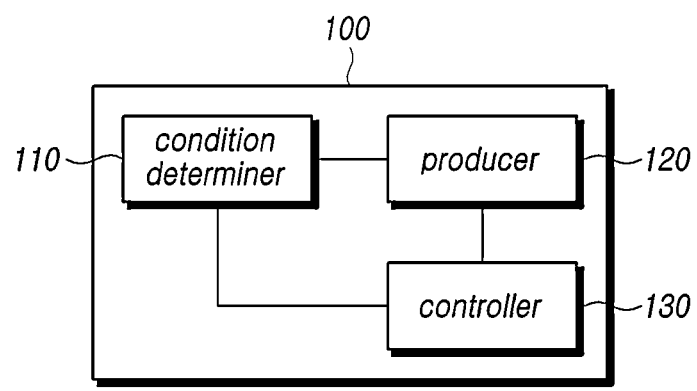
FIG. 1 is a block diagram illustrating a steering control device according to the disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

In the disclosure, stop reaction force control is defined as controlling to generate a reaction torque or reaction force based on stop reaction torque information. In this case, stop reaction force control may include controlling the reaction force motor to generate a stop reaction torque and controlling to provide a reaction force or reaction torque to the steering wheel based on the stop reaction torque generated from the reaction force motor.

FIG. 1 is a block diagram illustrating a steering control device according to the disclosure.

Referring to FIG. 1, according to the disclosure, a steering control device 100 may include a condition determiner 110, a producer 120, and a controller 130. The condition determiner 110, the producer 120, and the controller 130 may be connected to each other.

As an example, a steering control device 100 is a steering control device controlling a reaction force motor to generate a reaction torque in response to rotation of a steering wheel and may comprise a condition determiner determining whether a stop reaction force providing condition is met, the stop reaction force providing condition including a preset vehicle stop condition and reaction force provision preparation condition, a producer discerning and processing a scheme for producing stop reaction torque information based on remaining power information regarding a remaining power amount of a battery supplying power to the reaction force motor upon determining that the stop reaction force providing condition is met, and a controller controlling to generate a reaction torque to the steering wheel based on the stop reaction torque information.

The condition determiner 110 may determine whether the preset stop reaction force providing condition is met. In this case, the stop reaction force providing condition may include a preset vehicle stop condition and reaction force provision preparation condition.

The vehicle stop condition may include at least one or more conditions for identifying whether the vehicle stops. Since the scheme of supplying power to the steering device and the control logic for providing reaction force may vary depending on whether the vehicle stops, the vehicle stop condition may be set so that the stop reaction force control according to the disclosure is performed when the vehicle stop condition is met so that the vehicle is determined to stop.

Further, the vehicle stop condition may be set as meeting at least one of a plurality of conditions for identifying whether the vehicle stops.

For example, the vehicle stop condition may be set as meeting at least one of a condition where the ignition off of the vehicle is complete, a condition where the power off of the steering device is complete, or a condition where velocity information about the vehicle is determined to be less than a preset reference velocity. The reference velocity may be a vehicle velocity set to be used as a reference for determining whether the vehicle is stopped/driven.

The reaction force provision preparation condition may include at least one or more of conditions for identifying whether there is a likelihood that it is to be required to actually provide a reaction force to the steering wheel. In other words, although the vehicle is identified to be stopped, the stop reaction force control according to the disclosure may be set to be performed when the reaction force provision preparation condition is met in addition to such identification.

The reaction force provision preparation condition may be set as meeting at least one of a plurality of conditions for identifying whether there is a likelihood that it is to be required to provide a reaction force to the steering wheel.

For example, the reaction force provision preparation condition may be set as a condition meeting at least one of a condition where the steering torque information is determined to be a reference torque or more, a condition where the car key is recognized as being inserted in the vehicle, a condition where the vehicle door is recognized as open, or a condition where a person is recognized as being in the vehicle. The reference torque may be a torque set to be used as a reference for determining whether the driver holds the steering wheel.

The condition determiner 110 may determine that the stop reaction force providing condition is met when both the vehicle stop condition and the reaction force provision preparation condition are met. In other words, if the vehicle is determined to be stopped, and a steering torque actually occurs in the steering wheel due to an external force or, even before a steering torque is generated, there is a likelihood that an external force is to be applied to the steering wheel due to recognition of insertion of the car key or recognition of a person inside the vehicle, the condition determiner 110 may determine that it is needed to get ready for performing stop reaction force control on the steering wheel.

Accordingly, if the condition determiner 110 determines that both the vehicle stop condition and the reaction force provision preparation condition are met, the steering system may be powered on so that the reaction force motor and the steering wheel are switched into an electrically operable state.

The producer 120 may produce stop reaction torque information regarding the stop reaction force control generating stop reaction torque. In this case, the stop reaction torque information may be set to be produced when the stop reaction force providing condition is determined to be met.

The producer 120 may discern and process a scheme for producing stop reaction torque information based on remaining power information regarding the remaining power amount of the battery supplying power to the reaction force motor.

As an example, upon determining that the remaining power information is a preset reference power amount or more, the producer 120 may produce stop reaction torque information based on steering angular velocity information and steering angle displacement information.

In other words, if the remaining power amount of the battery is sufficient, the producer 120 may produce stop reaction torque information to perform stop reaction force control in such a manner as to provide a reaction force to the steering wheel by supplying power to the reaction force motor to generate a reaction torque.

Specifically, the producer 120 may produce steering angle displacement information based on steering angular velocity information and may produce the stop reaction torque information so that the magnitude of the stop reaction torque information increases as the steering angle displacement information increases.

For example, the stop reaction torque information may be produced to have a linear relationship with the steering angle displacement to meet, e.g., $Y=aX+b$ (where X is the steering angle displacement, and Y is the stop reaction torque).

As another example, the stop reaction torque information may be produced so that the increment of the stop reaction torque increases as the magnitude of the steering angle displacement increases, in the relationship between the steering angle displacement and the stop reaction torque increment. For example, the stop reaction torque information may be produced to have a curved relationship to meet $Y=aX^c+b$ (where X is the steering angle displacement, and Y is the stop reaction torque).

In other words, in the steering angle-stop reaction torque graph, the increment of the stop reaction torque, i.e., the slope of the graph, as well as the magnitude of the stop reaction torque, may be produced as increasing as the steering angle displacement increases.

As such, in the case where the stop reaction torque is produced by the curved relationship-based production scheme, since the stop reaction torque generated in the reaction force motor and the magnitude of the reaction force transferred to the steering motor increase as the steering angle displacement increases, the force of holding the steering wheel may be more quickly increased, enhancing the effect of preventing accident risks due to, e.g., idling of the steering wheel.

If the steering angle displacement reaches a preset reference steering angle displacement, the producer 120 may produce a preset maximum reaction torque as the stop reaction torque information. In this case, the maximum reaction torque may be set based on the maximum output of the reaction force motor.

If steering torque is generated in the steering wheel in the same direction even after the steering angle displacement reaches the reference steering angle displacement, the producer 120 may perform stop reaction force control to generate the stop reaction torque corresponding to the maximum reaction torque.

In sum, if the steering angle displacement information is the preset reference steering angle displacement or more, the producer 120 may produce the preset maximum reaction torque as the stop reaction torque information. If a reaction force or reaction torque is generated in the reaction force motor and steering wheel based on the maximum reaction torque, it is possible to enhance the effect of preventing an accident due to, e.g., idling of the steering wheel by providing a relatively strong reaction force to the driver holding the steering wheel.

If the remaining power information is the reference power amount or more, and a certain preset condition is further met, the producer 120 may reset the maximum reaction torque.

In general, since the reaction force provided to the steering wheel may increase as the magnitude of the stop reaction torque generated in the reaction force motor increases in performing stop reaction force control according to the disclosure, the effect of preventing an accident due to, e.g., idling of the steering wheel may further be enhanced.

However, during a period when the magnitude of the provided reaction force is a predetermined magnitude or more, the effect of preventing an accident by providing reaction force may not further be increased, or the increase rate may decrease. Further, since the amount of power consumed in providing a relatively large reaction force may be smaller than the amount of power consumed in providing a relatively small reaction force, the efficiency of stop reaction force control according to the increases in the provided reaction force may be relatively reduced in a period during which a predetermined magnitude is exceeded.

In particular, since the stop reaction force control according to the disclosure supplies power to the reaction force motor in the stopped state of the vehicle, the remaining battery power may be more quickly consumed than when power is supplied to the reaction force motor when the power is driven.

Given this, the maximum reaction torque may be reset to a smaller value, so that it is rendered possible to achieve stop reaction force control for a relatively long time.

Specifically, the maximum reaction torque may be reset based on the maximum output of the reaction force motor or may also be set to a value less than the maximum output of the reaction force motor or may be set based on a torque value which is enough to be able to prevent an accident.

Further, although the remaining battery power is the reference power amount or more, if the remaining power is relatively small, the maximum reaction torque may be reset to a value smaller than the existing setting value.

For example, if a condition where the remaining power information is the reference power amount or more and is less than a preset second reference power amount is met, the producer 120 may reduce the setting value of the maximum reaction torque based on the remaining power information.

As another example, the producer 120 may set the remaining power and the maximum reaction torque to have a constant linear relationship and may set the maximum reaction torque as the torque calculated based on the set linear relationship.

However, too frequent resetting of the maximum reaction torque may rather waste resources in controlling the stop reaction force control and deteriorate control efficiency. In consideration of this, the producer 120 may divide the remaining battery power into predetermined sections and allow the maximum reaction torque to be reset to a different magnitude for each section, so that resetting is performed only when the remaining battery power changes to the section different from the current section.

The producer 120 may produce stop reaction torque information based on the steering angle displacement information and preset lookup table information.

The lookup table information may include information configured in such a format in which the stop reaction torque value corresponding to each steering angle displacement value is stored with each steering angle displacement value used as an index.

If the stop reaction torque information is produced using the lookup table information, the production may be done by extracting the torque value corresponding to the index value corresponding to the steering angle displacement information in the lookup table without a separate equation-based computation process, so that the velocity of producing the stop reaction torque information may be increased.

Producing stop reaction torque and setting the maximum reaction torque when the remaining power information is the reference power amount or more is described below in further detail with reference to FIGS. 4 and 5.

If the remaining power information is determined to be less than the reference power amount, the producer 120 may produce the stop reaction torque information based on a preset motor braking torque.

In other words, if the remaining battery power is insufficient, the producer 120 may produce stop reaction torque information to perform stop reaction force control in a scheme of using the torque generated by controlling the switching of the inverter to short the motor coil.

The motor braking torque may include the torque generated by controlling the switching element of the inverter to short the motor coil. For example, if the reaction force motor is a three-phase motor, the motor braking torque may include the torque generated by controlling the switching element of the inverter to short the motor coil corresponding to each phase of the motor.

The current necessary to generate the motor braking torque may be relatively lower than the current necessary to generate the stop reaction torque based on the stop reaction torque information produced as the remaining power information is determined to be the preset reference power amount or more.

Producing stop reaction torque and setting the motor braking torque when the remaining power information is less than the reference power amount is described below in further detail with reference to FIGS. 6 and 7.

The controller 130 may control to generate a reaction torque in the steering wheel based on the stop reaction torque information. In this case, the controller 130 may control to generate stop reaction torque in the reaction force motor and may include controlling to generate reaction torque in the steering wheel as the stop reaction torque generated in the reaction force motor is transferred to the steering wheel.

The controller 130 may control to generate a torque corresponding to the stop reaction torque information in the reaction force motor based on the stop reaction torque information produced in a different scheme according to the remaining power information.

As an example, if the remaining power information is determined to be the reference power amount or more and the stop reaction torque information is produced, the controller 130 may control to drive the reaction force motor to generate the torque corresponding to the stop reaction torque information. In this case, the controller 130 may control to allow a motor braking current to be generated in the reaction force motor, so that the stop reaction torque is generated.

As another example, if the remaining power information is determined to be less than the reference power amount, and the stop reaction torque information is produced, the controller 130 may control to generate the torque corresponding to the stop reaction torque information in the reaction force motor by controlling the switching element of the inverter to short the motor coil. In this case, the controller 130 may control to supply a motor driving current to the reaction force motor to generate the stop reaction torque.

Separately from discerning and processing the scheme of producing stop reaction torque information based on the remaining power information in the producer 120, the controller 130 may independently determine the remaining battery power and perform the stop reaction force control in a different scheme according to a result of the determination.

In other words, the controller 130 may determine that the providable power is sufficient if the remaining battery power is the reference power amount or more and may determine that the providable power is insufficient if the remaining power amount is less than the reference power amount.

Accordingly, if the providable power is determined to be sufficient, the controller 130 may perform the stop reaction force control in the scheme of generating reaction torque by supplying the motor driving current to the reaction force motor and, if the providable power is determined to be insufficient, the controller 130 may perform the stop reaction force control in the scheme of generating reaction torque by allowing a motor braking current to be generated in the reaction force motor.

Meanwhile, in performing stop reaction force control, the motor driving current supplied to the reaction force motor may have a relatively higher magnitude than the motor braking current. Accordingly, if the remaining battery power is insufficient, the stop reaction force control is performed by generating a motor braking current having a relatively lower magnitude, thereby reducing the risk of battery discharge due to providing a reaction force in the stopped state.

In particular, if the steering device continuously supplies power through the stop reaction force control in the engine off state of the engine-driven vehicle or the converter off state of the electricity-driven vehicle, the battery may more quickly be discharged and, if the battery is discharged in the off state, additional issues may arise. Thus, it is required to respond based on a different scenario depending on the battery capacity.

Figure 2:
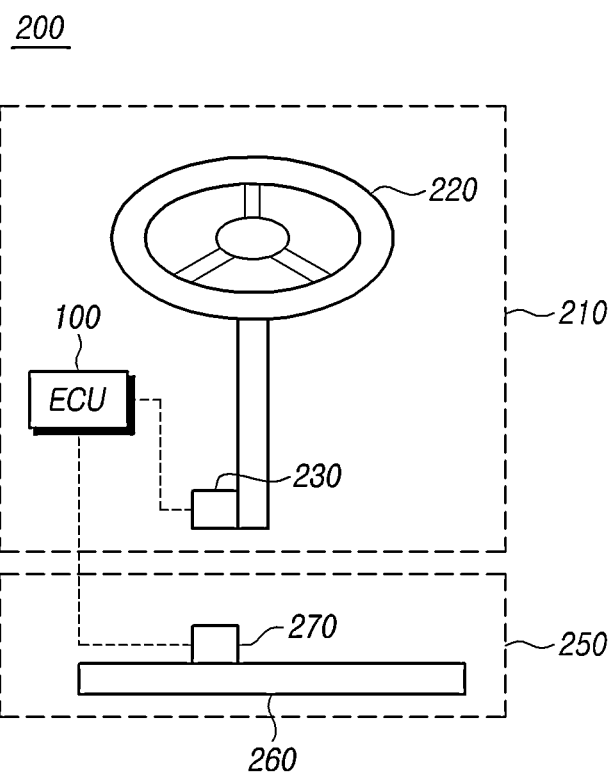
FIG. 2 is a view illustrating an example configuration of a vehicle steering device according to an embodiment.

FIG. 2 is a view illustrating an example configuration of a vehicle steering device according to an embodiment.

Referring to FIG. 2, according to an embodiment, a steering device 200 may include a steering control device 100, a steering reaction force device 210 including a steering wheel 220 and a reaction force motor 230 and generating a steering feedback torque using the reaction force motor 230, and a steering driving device 250 including a rack 260 and a rack driving motor 270 and generating a rack driving torque using the rack driving motor 270.

In some cases, the steering reaction force device 210 and the steering driving device 250 of the steering device 200 may be steer-by-wire devices physically separated from each other, and the steering reaction force device 210 may be referred to as a steering feedback actuator (SFA), and the steering driving device 250 may be referred to as a road wheel actuator (RWA).

The steering reaction force device 210 may include any other components, necessary to operate the upper end of the steering device 200, such as a component for operating the steering wheel 220 and the reaction force motor 230 or producing and transmitting information according to the operation and a component for producing, generating, and transferring the steering torque and steering feedback torque, as well as the steering wheel 220 and the reaction force motor 230.

The steering driving device 250 may include any other components, necessary for operating the lower end of the steering device 200, such as a component for operating the rack 260 and the rack driving motor 270 or producing and transmitting information according to the operation and a component for producing, generating, and transferring the rack driving torque, as well as the rack 260 and the rack driving motor 270.

The above-described steering device 200 may be equipped with the steering control device 100 according to the disclosure and each component thereof may be controlled by the steering control device 100. The above description may be applicable to the steering device described below in connection with FIGS. 3 to 7.

Figure 3:
FIG. 3 is a graph illustrating an example of a condition for performing stop reaction force control according to an embodiment.

FIG. 3 is a graph illustrating an example of a condition for performing stop reaction force control according to an embodiment.

Referring to FIG. 3, according to an embodiment, the stop reaction force control may be performed when a preset stop reaction force providing condition is met. In this case, the stop reaction force providing condition may be determined to be met when both the vehicle stop condition and the reaction force provision preparation condition are met.

For example, the vehicle stop condition may be set as meeting at least one of a condition where the ignition off of the vehicle is complete, a condition where the power off of the steering device is complete, or a condition where velocity information about the vehicle is determined to be less than a preset reference velocity.

Further, the reaction force provision preparation condition may be set as a condition meeting at least one of a condition where the steering torque information is determined to be a reference torque or more, a condition where the car key is recognized as being inserted in the vehicle, a condition where the vehicle door is recognized as open, or a condition where a person is recognized as being in the vehicle.

In relation thereto, referring to FIG. 3, in the illustrated context, each of the vehicle stop condition and the reaction force provision preparation condition is met and, accordingly, the stop reaction force providing condition may be determined to be met.

Specifically, since whether the vehicle stop condition may be determined so that the driver is able to try to get in or out of the vehicle in FIG. 3, the vehicle stop condition may be determined to be met as the condition where the velocity information is less than the reference velocity is met.

In connection with determining whether the reaction force provision preparation condition is met, FIG. 3 shows the context where the driver is holding the steering wheel. Thus, the condition where the steering torque information is determined to be the reference torque or more may be determined to be met. Since the vehicle door is open, the condition where the vehicle door is recognized as open may be determined to be met. Further, since the driver is on the driver seat, the condition where the driver is determined to be inside the vehicle may be determined to be met. Accordingly, the reaction force provision preparation condition may be determined to be met.

Resultantly, the steering control device according to the disclosure may determine that the context shown in FIG. 3 is the case where, as each of the vehicle stop condition and the reaction force provision preparation condition is met, the stop reaction force providing condition is met so that the stop reaction force control may be performed.

FIGS. 4 to 7 are graphs illustrating an example of a configuration of performing stop reaction force control in a steering control device according to an embodiment.

Figure 4:
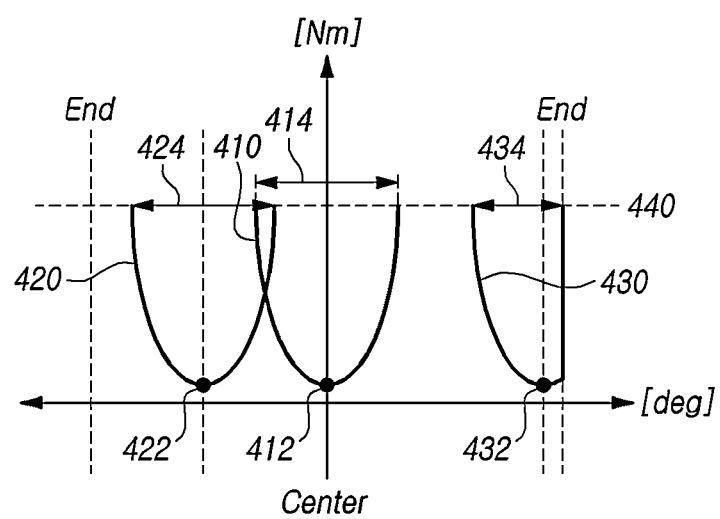
FIG. 4 is a graph illustrating an example in which a steering control device drives a reaction force motor to perform stop reaction force control according to an embodiment.

FIG. 4 is a graph illustrating an example in which a steering control device drives a reaction force motor to perform stop reaction force control according to an embodiment.

Referring to FIG. 4, the steering control device according to an embodiment may control to generate a stop reaction torque in the reaction force motor with respect to the position where the steering torque starts to be generated in the steering wheel and thereby control to generate a reaction force or reaction torque in the steering wheel.

In this case, the steering control device may control to generate the stop reaction torque within a predetermined operable range with respect to the start point. The steering control device may control to increase the magnitude of the stop reaction torque that is to be generated as the steering angle displacement calculated with respect to the start point increases. A curve representing the relationship between steering angle displacement and stop reaction torque with respect to one start point may be represented as one reaction torque curve. The operable range may be set to have a different size depending on the case.

For example, the steering control device may perform stop reaction force control based on a first reaction torque curve 410, a second reaction torque curve 420, and a third reaction torque curve 430.

The first reaction torque curve 410 may be a reaction torque curve based on a first start point 412, the second reaction torque curve 420 may be a reaction torque curve based on a second start point 422, and the third reaction torque curve 430 may be a reaction torque curve based on a third start point 432.

The first reaction torque curve 410 may be a reaction torque curve represented based on the first start point 412 which is a central point. In this case, a predetermined range in which stop reaction torque is generated to two opposite sides of the first start point 412 may be represented as a first operable range 414.

For example, if a steering torque is generated in the steering wheel in the context where the stop reaction force providing condition is met, and the steering wheel is stopped in the center position, the stop reaction force control may be performed according to the first reaction torque curve 410.

In such a case, the stop reaction force control may be performed so that the magnitude of the stop reaction torque is increased as the steering angle displacement based on the first start point 412 is increased in the first operable range 414.

Further, if the steering angle displacement reaches the preset reference steering angle displacement, the stop reaction force control may be performed to generate the stop reaction torque corresponding to a preset maximum reaction torque 440. Here, the maximum reaction torque may be set based on the maximum torque that may be output by the reaction force motor.

Further, if the steering wheel is continuously rotated by the steering torque even after the steering angle displacement exceeds the reference steering angle displacement, the stop reaction force control may be performed to keep generating the stop reaction torque corresponding to the maximum reaction torque.

As such, upon performing stop reaction force control as a steering torque exceeding the reference torque based on the first start point 412 in the context of meeting the stop reaction force providing condition is generated, the steering control device may perform stop reaction force control to generate the stop reaction torque within the range of the maximum reaction torque 440 as the steering angle displacement increases as in the first reaction torque curve 410, thus preventing the driver's accident due to, e.g., idling of the steering wheel.

The second reaction torque curve 420 may be a reaction torque curve represented based on the second start point 422. In this case, even when the second start point 422 is not the center position, it is possible to produce the steering angle displacement and stop reaction torque information according thereto, within a second operable range 424, based on the second start point 422 and to perform stop reaction force control on the reaction force motor within the range of the maximum reaction torque 440.

The third reaction torque curve 430 may be a reaction torque curve represented based on the third start point 432. In this case, stop reaction force control may be performed within a third operable range 434 based on the third start point 432.

However, as shown in FIG. 4, the third operable range 434 based on the third start point 432 may differ in size from the first operable range 414 and the second operable range 424.

As an example, the third operable range 434 may be limited by the operable range of the steering wheel. Specifically, the third operable range 434 may be limited, on the right side of the third start point 432, by the right end of the steering wheel operable range.

If the steering torque is generated to the right in the context where the steering wheel arrives at the right end, an external force is generated by the steering wheel's reaction to the right end, so that stop reaction force control may be performed in a manner in which no other reaction torque than the external force by the end is generated.

Figure 5:
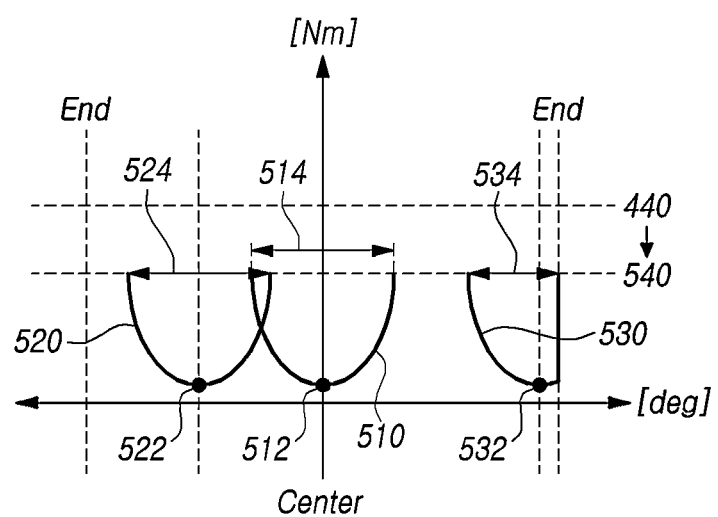
FIG. 5 is a graph illustrating an example in which a steering control device resets maximum reaction torque to perform stop reaction force control according to an embodiment.

FIG. 5 is a graph illustrating an example in which a steering control device resets maximum reaction torque to perform stop reaction force control according to an embodiment.

Referring to FIG. 5, the steering control device according to an embodiment may reset the maximum reaction torque 440 when the remaining power information is the reference power amount or more and meets a preset condition and may perform stop reaction force control based on the reset maximum reaction torque 540.

As an example, if the remaining power information is the reference power amount or more and meets a preset second reference power amount or more, the maximum reaction torque 440 may be reset to the maximum output of the reaction force motor.

As another example, if the condition where the remaining power information is the reference power amount or more and is less than the second reference power amount, the maximum reaction torque 440 may be reset in such a manner as to reduce the existing setting value. In this case, the maximum reaction torque may be reset in a manner of subtracting a specific value from the maximum output of the reaction force motor or multiplying it by a predetermined ratio followed by subtracting or may be reset in a manner of previously setting a new torque value separate from the maximum output.

If the maximum reaction torque 440 is reset, subsequent stop reaction force control may be performed based on the reset maximum reaction torque 540.

Accordingly, although stop reaction force control is performed based on the same start point, the reaction torque curve and the magnitude of the stop reaction torque may be varied.

As an example, since the first reaction torque curve is a reaction torque curve shown based on the first start point 412 but, unlike in FIG. 4, the stop reaction torque is calculated based on the reset maximum motor torque 540 and stop reaction force control is performed, it may differ from when the increment or variation rate of the stop reaction torque according to the steering angle displacement is performed based on the maximum motor torque 440.

However, the first operable range 514 may be set to have the same operable range as that of FIG. 4 although stop reaction force control is performed based on the reset maximum motor torque 540. Of course, the first operable range 514 may also be reset separately.

As another example, like the first reaction torque curve 510 and the first operable range 514 based on the first start point 512, the second reaction torque curve 520 and second operable range 524 based on the second start point 522 and the third reaction torque curve 530 and third operable range 534 based on the third start point 532 may be shown as partially identical or partially as different, based on the reset maximum reaction torque 540.

As such, if stop reaction force control is performed based on the maximum reaction torque 540 reset to a value smaller than the maximum reaction torque 440, it is possible to relatively reduce power consumption and thus increase the time of being able to perform stop reaction force control relative to the remaining battery power.

As a result, it is possible to reduce the risk of battery discharge due to provision of a reaction force in the stopped state by performing stop reaction force control based on the reset maximum reaction torque 540.

Figure 6:
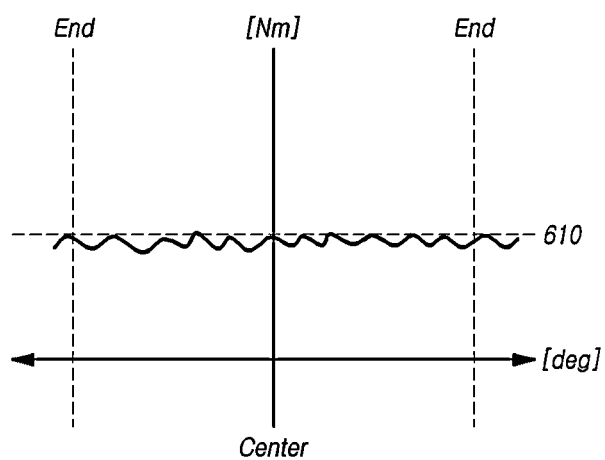
FIG. 6 is a graph illustrating an example in which a steering control device performs stop reaction force control using motor braking torque according to an embodiment.

FIG. 6 is a graph illustrating an example in which a steering control device performs stop reaction force control using motor braking torque according to an embodiment.

Referring to FIG. 6, if the remaining power information is determined to be less than the reference power amount, and the stop reaction torque information is produced, the controller 130 may control to generate the torque corresponding to the stop reaction torque information in the reaction force motor by controlling the switching element of the inverter to short the motor coil.

As an example, if the remaining power information is determined to be less than the reference power amount, the steering control device may produce stop reaction torque information based on a preset motor braking torque 610 and perform stop reaction force control.

Specifically, the steering control device may perform stop reaction force control by generating the current corresponding to the motor braking current in a manner of controlling either the lower switching elements or upper switching elements of the inverter to all turn on to short the motor coil corresponding to each phase of the reaction force motor.

In some cases, when stop reaction force control is performed based on the motor braking torque, the generated reaction force and reaction torque may not form the reaction torque curve as shown in FIGS. 4 and 5.

However, such a scheme may provide a stop reaction torque to the reaction force motor based on a relatively small motor braking current even when the remaining battery power is very small and transfer the stop reaction torque to provide the reaction force. Thus, even when the remaining power information is less than the reference power amount, it is possible to provide stop reaction force control, keeping the effect of preventing an accident due to, e.g., idling of the steering wheel.

Figure 7:
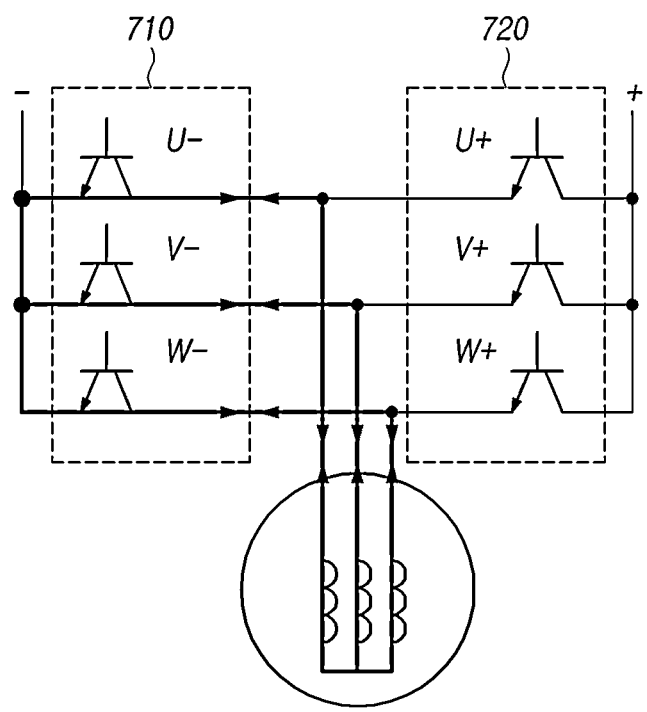
FIG. 7 is a view illustrating an example in which a steering control device controls a switching element of an inverter to generate a motor braking torque according to an embodiment.

FIG. 7 is a view illustrating an example in which a steering control device controls a switching element of an inverter to generate a motor braking torque according to an embodiment.

Referring to FIG. 7, according to an embodiment, the steering control device may control the operation of the inverter, generating a motor braking torque in the reaction force motor. In this regard, the steering control device may control to turn on or off each switching element of the inverter. The generation of a motor braking torque may be performed in such a manner as to generate a constant load or restraint force using the inverter and exert it to the reaction force motor.

The inverter may include lower switching elements 710 and upper switching elements 720. The lower switching elements 710 and the upper switching elements 720 may include at least one or more switching elements respectively corresponding to the phases of the motor.

For example, if the reaction force motor is a three-phase motor, the inverter connected to the reaction force motor may include three lower switching elements 710 and three upper switching elements 720 respectively corresponding to the phases of the reaction force motor.

Two switching elements of the inverter may be connected in series to each phase (U phase, V phase, and W phase), and each switching element may be connected to the motor coil corresponding to each phase of the motor.

As an example, stop reaction force control based on the motor braking torque may be performed in such a manner as to control either the lower switching elements 710 or the upper switching elements 720 of the inverter to all turn on to short the motor coil corresponding to each phase of the reaction force motor.

As a specific example, the steering control device may control to turn on the three lower switching elements 710 connected to the negative voltage side of each phase and turn off the three upper switching elements 720 connected to the positive voltage side of each phase, shortening the motor coil corresponding to each phase of the motor and thereby generating a motor braking torque.

As another specific example, the steering control device may control to turn on the three upper switching elements 720 connected to the positive voltage side of each phase and turn off the three lower switching elements 710 connected to the negative voltage side of each phase, shortening the motor coil corresponding to each phase of the motor and thereby generating a motor braking torque.

Meanwhile, the steering control device may control to vary the magnitude of the motor braking torque by changing the duty ratio in the switching operation of the inverter. Specifically, the steering control device may change the duty ratio of the pulse width modulation (PWM) pulse and may control to turn on or off the switch of the inverter according to the adjusted duty ratio. In other words, the steering control device may adjust the on-operation time by pulse width control, generating a desired magnitude of motor braking torque.

For example, the steering control device may control to generate different magnitudes of motor braking currents by controlling the pulse width, which gives the on-operation time, upon controlling the three lower switching elements 710 connected to the negative voltage side of each phase to simultaneously be switched from on to off operation state.

Further, the steering control device may generate a system braking torque using the motor braking torque generated in the reaction force motor and may control the reducer to generate different magnitudes of system braking torques. Specifically, the steering control device may control to vary the magnitude of the system braking torque by changing the reduction ratio of the reducer based on the motor braking torque.

In sum, the steering control device may generate the motor braking torque through the switching of the inverter and control to generate different magnitudes of motor braking torques by changing the duty ratio. Further, the steering control device may generate the system braking torque using the motor braking torque and control to vary the system braking torque by changing the reduction ratio of the reducer.

Resultantly, the steering control device may provide a reaction force sensation to the steering wheel through control to generate a motor braking torque and system braking torque even when the remaining power information is less than the reference power amount by the above-described control process.

The steering control device 100 is described again below in light of a method, and what has been described above is omitted as necessary, but is also applicable to the method.

Figure 8:
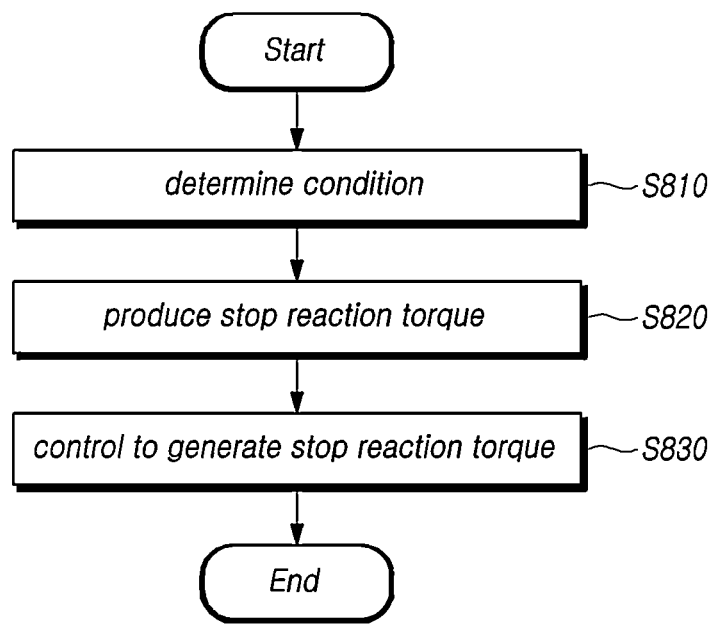
FIG. 8 is a flowchart illustrating a steering control method according to an embodiment.

FIG. 8 is a flowchart illustrating a steering control method according to an embodiment.

Referring to FIG. 8, according to an embodiment, a steering control method may include a condition determination step S810, an information production step S820, and a stop reaction force control step S830.

As an example, a steering control method is a steering control method controlling a reaction force motor to generate a reaction torque in response to rotation of a steering wheel and may comprise a condition determination step determining whether a stop reaction force providing condition is met, the stop reaction force providing condition including a preset vehicle stop condition and reaction force provision preparation condition, an information production step discerning and processing a scheme for producing stop reaction torque information based on remaining power information regarding a remaining power amount of a battery supplying power to the reaction force motor upon determining that the stop reaction force providing condition is met, and a stop reaction force control step controlling to generate a stop reaction torque to the steering wheel based on the stop reaction torque information.

The condition determination step S810 may determine whether the preset stop reaction force providing condition is met. In this case, the stop reaction force providing condition may include a vehicle stop condition and reaction force provision preparation condition.

In some cases, the condition determination step S810 may determine that the stop reaction force providing condition is met when both the vehicle stop condition and the reaction force provision preparation condition are met.

For example, the condition determination step S810 may determine that the vehicle stop condition is met when at least one of a condition where the ignition off of the vehicle is complete, a condition where the power off of the steering device is complete, or a condition where velocity information about the vehicle is determined to be less than a preset reference velocity is met.

As another example, the condition determination step S810 may determine that the reaction force provision preparation condition is met as at least one of a condition meeting at least one of a condition where the steering torque information is determined to be a reference torque or more, a condition where the car key is recognized as being inserted in the vehicle, a condition where the vehicle door is recognized as open, or a condition where a person is recognized as being in the vehicle is met.

If the condition determination step S810 determines that both the vehicle stop condition and the reaction force provision preparation condition are met, the steering system may be powered on so that the reaction force motor and the steering wheel are switched into an electrically operable state.

The information production step S820 may produce stop reaction torque information regarding the stop reaction force control generating stop reaction torque. In this case, the stop reaction torque information may be set to be produced when the stop reaction force providing condition is determined to be met.

The information production step S820 may discern and process a scheme for producing stop reaction torque information based on remaining power information regarding the remaining power amount of the battery supplying power to the reaction force motor.

As an example, upon determining that the remaining power information is a preset reference power amount or more, the information production step S820 may produce stop reaction torque information based on steering angular velocity information and steering angle displacement information.

In other words, if the remaining power amount of the battery is sufficient, the producer 120 may produce stop reaction torque information to perform stop reaction force control in such a manner as to provide a reaction force to the steering wheel by supplying power to the reaction force motor to generate a reaction torque.

Further, in the information production step S820, although the remaining battery power is the reference power amount or more, if the remaining power is relatively small, the maximum reaction torque may be reset to a value smaller than the existing setting value.

For example, if a condition where the remaining power information is the reference power amount or more and is less than a preset second reference power amount is met, the information production step S820 may reduce the setting value of the maximum reaction torque based on the remaining power information.

As another example, if the remaining power information is determined to be less than the reference power amount, the information production step S820 may produce the stop reaction torque information based on a preset motor braking torque.

In other words, if the remaining battery power is insufficient, the producer 120 may produce stop reaction torque information to perform stop reaction force control in a scheme of using the torque generated by controlling the switching of the inverter to short the motor coil.

The stop reaction force control step S830 may control to generate a reaction torque in the steering wheel based on the stop reaction torque information. In this case, the stop reaction force control step S830 may control to generate stop reaction torque in the reaction force motor and may include controlling to generate reaction torque in the steering wheel as the stop reaction torque generated in the reaction force motor is transferred to the steering wheel.

The stop reaction force control step S830 may control to generate a torque corresponding to the stop reaction torque information in the reaction force motor based on the stop reaction torque information produced in a different scheme according to the remaining power information.

As an example, if the remaining power information is determined to be the reference power amount or more and the stop reaction torque information is produced, the stop reaction force control step S830 may control to drive the reaction force motor to generate the torque corresponding to the stop reaction torque information. In this case, the stop reaction force control step S830 may control to allow a motor braking current to be generated in the reaction force motor, so that the stop reaction torque is generated.

As another example, if the remaining power information is determined to be less than the reference power amount, and the stop reaction torque information is produced, the stop reaction force control step S830 may control to generate the torque corresponding to the stop reaction torque information in the reaction force motor by controlling the switching element of the inverter to short the motor coil. In this case, the stop reaction force control step S830 may control to supply a motor driving current to the reaction force motor to generate the stop reaction torque.

Separately from discerning and processing the scheme of producing stop reaction torque information based on the remaining power information in the information production step S820, the stop reaction force control step S830 may independently determine the remaining battery power and perform the stop reaction force control in a different scheme according to a result of the determination.

Accordingly, if the remaining battery power is insufficient, the stop reaction force control is performed by supplying a motor braking current having a relatively lower magnitude, thereby reducing the risk of battery discharge due to providing a reaction force in the stopped state.

Figure 9:
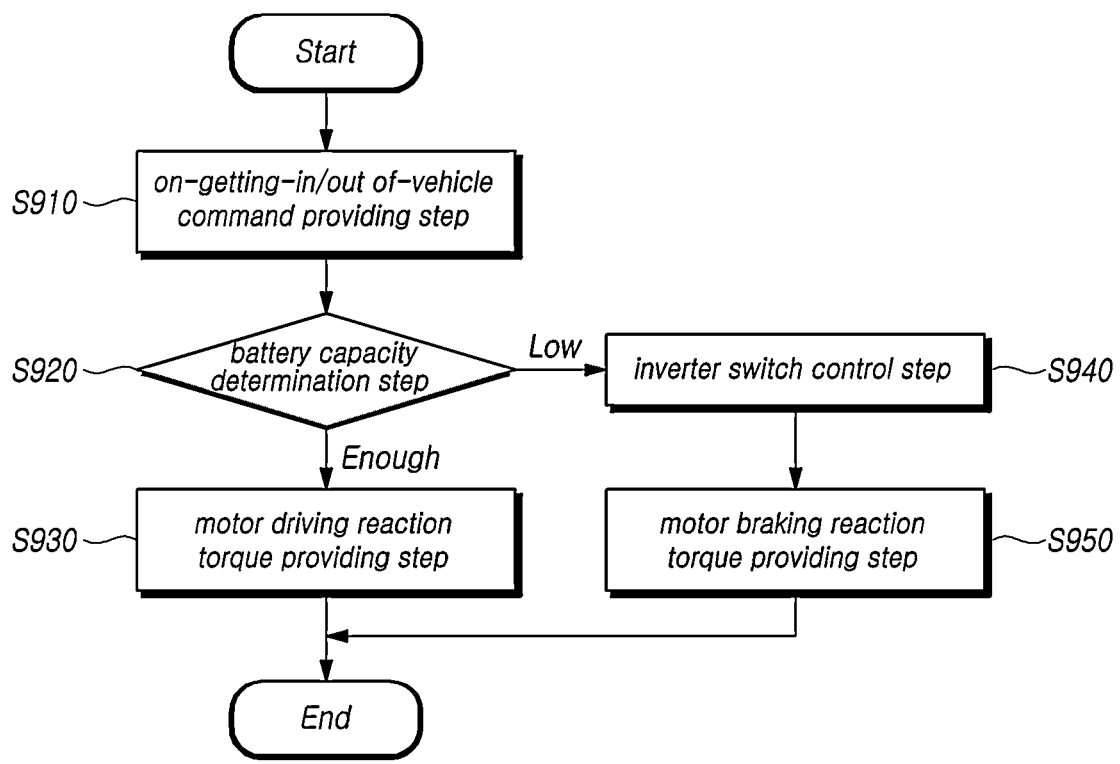
FIG. 9 is a flowchart illustrating an example of a configuration of performing a steering control method according to another embodiment.

FIG. 9 is a flowchart illustrating an example of a configuration of performing a steering control method according to another embodiment.

According to another embodiment, a steering control method may include an on-getting-in/out of-vehicle command providing step S910, a battery capacity determination step S920, a motor driving reaction torque providing step S930, an inverter switch control step S940, and a motor braking reaction torque providing step S950.

The on-getting-in/out of-vehicle command providing step S910 may include providing a reaction force command for performing stop reaction force control in the context of getting in/out of the vehicle and providing a battery capacity command for determining the remaining battery capacity.

As such, based on the command provided in the on-getting-in/out of-vehicle command providing step S910, stop reaction force control may be performed in a different manner depending on the result of determining the remaining battery capacity in a subsequent step.

The battery capacity determination step S920 may include determining the remaining capacity of the battery connected to the reaction force motor to supply power. In this case, the remaining battery capacity may be determined based on whether the remaining battery capacity is a preset reference power amount or more.

If the battery capacity is determined to be enough in the battery capacity determination step S920, the motor driving reaction torque providing step S930 may be performed. Alternatively, if the battery is determined to be low, the inverter switch control step S940 may be performed.

The motor driving reaction torque providing step S930 may include performing stop reaction force control by generating a motor driving reaction torque based on the motor driving current when the battery capacity is determined to be enough.

In this case, the motor driving current may mean the current generally provided when a reaction torque is generated by driving the reaction force motor and may have a relatively high current value as compared with the motor braking current provided in the motor braking reaction torque providing step S950.

As such, when stop reaction force control is performed based on the motor driving current, it is possible to provide a reaction force for each operation angle and steering wheel position by driving the motor. Accordingly, it is possible to perform stop reaction force control to provide a reaction force considering the steering angle displacement for the steering torque generated in the steering wheel in the context of getting in/out of the vehicle.

The inverter switch control step S940 may include generating a motor braking torque by manipulating the switch of the inverter when the battery capacity is determined to be low.

Specifically, the inverter switch control step S940 may include controlling the operation of generating a braking torque by closing the entire inverter in the ECU of the steering device. As such, if the rotation of the steering wheel is restricted by using the own raking torque, the driving current is very low, and it is thus possible to reduce the risk of battery discharge.

For example, it is possible to perform stop reaction force control by generating the current corresponding to the motor braking current in a manner of controlling either the lower switching elements or upper switching elements of the inverter to all turn on to short the motor coil corresponding to each phase of the reaction force motor.

The motor braking reaction torque providing step S950 may include performing stop reaction force control to provide a reaction force to the steering wheel by generating a motor braking reaction torque based on the motor braking current.

In this case, the motor braking current may have a relatively low current value as compared with the motor driving current provided in the motor driving reaction torque providing step S930.

In some cases, the motor braking reaction torque providing step S950 may not generate a desired reaction force curve if performing stop reaction force control by generating a motor braking reaction torque based on the motor braking current.

However, since stop reaction force control may be performed only by generating a relatively small magnitude of motor braking current, it is possible to provide a reaction force even when the remaining battery capacity is insufficient, thereby preventing an accident due to, e.g., idling of the steering wheel when getting in or out of the vehicle.

Figure 10:
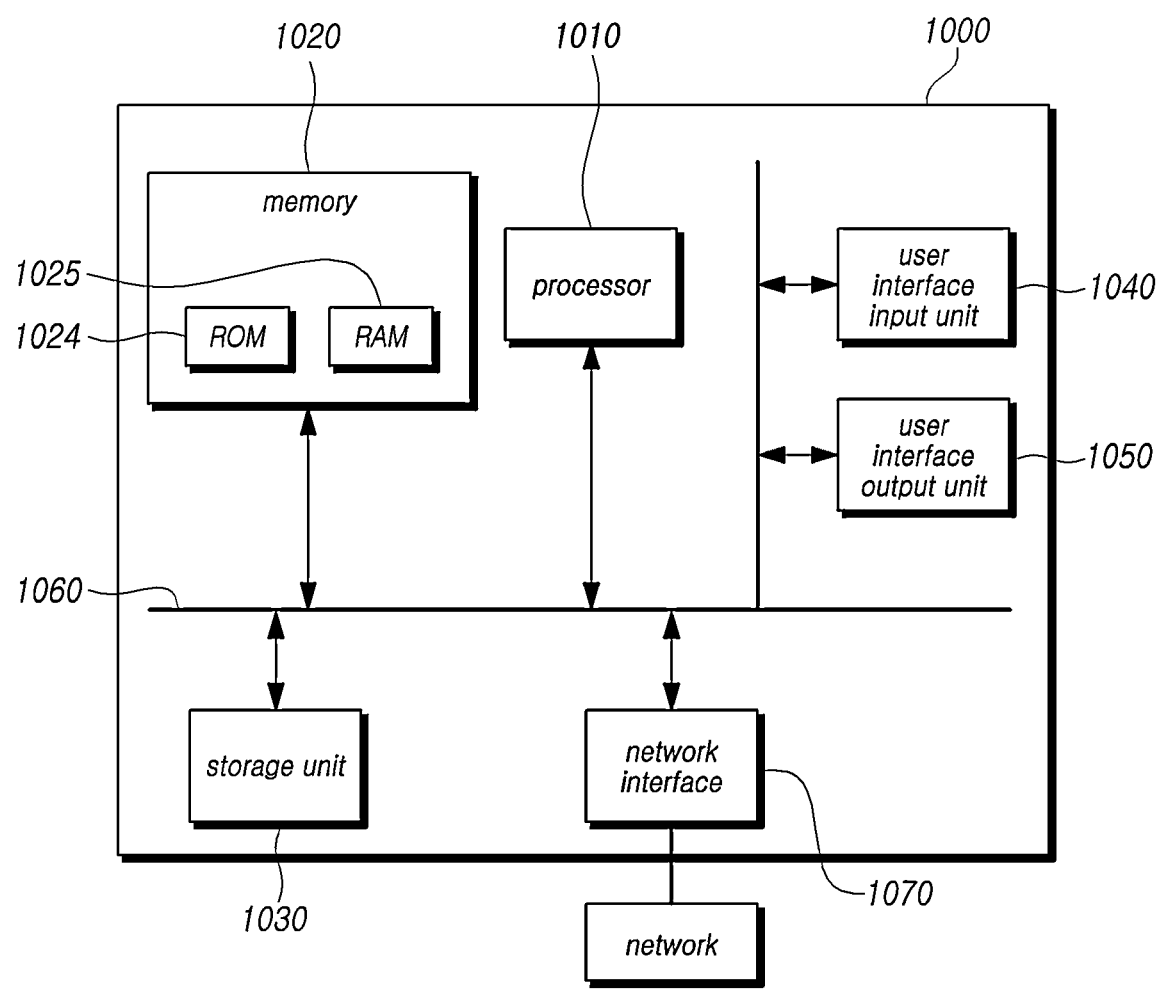
FIG. 10 is a block diagram illustrating a configuration of a computer system of a steering control device according to an embodiment.

FIG. 10 is a block diagram illustrating a configuration of a computer system of a steering control device according to an embodiment.

Referring to FIG. 10, the above-described embodiments may be implemented as, e.g., a computer-readable recording medium, in a computer system. As illustrated in the drawings, the computer system 1000, as an example of the steering control device according to the present embodiments, may include at least one of one or more processors 1010, a memory 1020, a storage unit 1030, a user interface input unit 1040, and a user interface output unit 1050 which may communicate with each other via a bus 1060. The computer system 1000 may further include a network interface 1070 for connecting to a network. The processor 1010 may be a central processing unit (CPU) or semiconductor device that executes processing instructions stored in the memory 1020 and/or the storage unit 1030. The memory 1020 and the storage unit 1030 may include various types of volatile/non-volatile storage media. For example, the memory 1200 may include a read only memory (ROM) 1024 and a random access memory (RAM) 1025.

Accordingly, the embodiments may be implemented as a non-volatile computer recording medium storing computer-implemented methods or computer executable instructions. The instructions may be executed by the processor to perform a method according to the present embodiments of the disclosure.

Specifically, the steering control device 100 according to the present embodiments and the condition determiner 110, the producer 120, and the controller 130 included therein may be implemented as some modules of the control device or ECU of the steering system installed in the vehicle.

The control device or ECU of the steering system may include a processor, a storage device, such as memory, and a computer program capable of performing specific functions, and the above-described condition determiner 110, producer 120, and controller 130 may be implemented as software modules capable of performing their respective corresponding functions.

In other words, the condition determiner 110, producer 120, and controller 130 according to the present embodiments may be implemented as their respective corresponding software modules which are then stored in the memory, and each software module may be performed by a computation processing device, such as the ECU included in the steering system, at a specific time.

As described above, the disclosure may provide a steering control device and method capable of providing a reaction force to the steering wheel even in the context where the vehicle is parked.

The disclosure may also provide a steering control device and method capable of providing a reaction force to the steering wheel to fit each context considering the remaining battery capacity.

According to the disclosure, there may also be provided a steering control device and method capable of providing a reaction force to the steering wheel even when the magnitude of current capable of driving is low.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering control device controlling a reaction force motor to generate a reaction torque in response to rotation of a steering wheel, the steering control device comprising:
    a condition determiner determining whether a stop reaction force providing condition is met, the stop reaction force providing condition including a preset vehicle stop condition and reaction force provision preparation condition;
    a producer discerning and processing a scheme for producing stop reaction torque information based on remaining power information regarding a remaining power amount of a battery supplying power to the reaction force motor upon determining that the stop reaction force providing condition is met; and
    a controller controlling to generate a reaction torque to the steering wheel based on the stop reaction torque information.

2. The steering control device of claim 1, wherein the vehicle stop condition is set as a condition meeting at least one of a condition where an ignition off of a vehicle is complete, a condition where a power off of the steering device is complete, or a condition where velocity information about the vehicle is determined to be less than a preset reference velocity, and the reaction force provision preparation condition is set as a condition meeting at least one of a condition where steering torque information is determined to be a reference torque or more, a condition where a car key is recognized as being inserted in the vehicle, a condition where a door of the vehicle is recognized as open, or a condition where a person is recognized as being in the vehicle, and
    wherein the condition determiner determines that the stop reaction force providing condition is met when both the vehicle stop condition and the reaction force provision preparation condition are met.

3. The steering control device of claim 1, wherein if the remaining power information is determined to be a preset reference power amount or more, the producer produces steering angle displacement information based on steering angular velocity information and produces the stop reaction torque information so that a magnitude of the stop reaction torque information increases as a magnitude of the steering angle displacement information increases, and
    wherein if the steering angle displacement information is a preset reference steering angle displacement or more, the producer produces a preset maximum reaction torque as the stop reaction torque information.

4. The steering control device of claim 3, wherein the producer produces the stop reaction torque information based on preset lookup table information according to the steering angle displacement information, and
    wherein the lookup table information is set in such a format in which a stop reaction torque value corresponding to each steering angle displacement value is stored with each steering angle displacement value used as an index.

5. The steering control device of claim 3, wherein if the remaining power information is the reference power amount or more and is less than a preset second reference power amount, the producer reduces a setting value of the maximum reaction torque based on the remaining power information.

6. The steering control device of claim 1, wherein if the remaining power information is determined to be less than a preset reference power amount, the producer produces the stop reaction torque information based on a preset motor braking torque.

7. The steering control device of claim 6, wherein the motor braking torque includes information regarding a torque generated when braking the reaction force motor by controlling a switching element of an inverter connected to the reaction force motor to short a motor coil.

8. The steering control device of claim 1, wherein if the remaining power information is determined to be a preset reference power amount or more so that the stop reaction torque information is produced, the controller controls to drive the reaction force motor to generate a torque corresponding to the stop reaction torque information.

9. The steering control device of claim 1, wherein if the remaining power information is determined to be less than a preset reference power amount so that the stop reaction torque information is produced, the controller controls a switching element of an inverter to short a motor coil of the reaction force motor.

10. A steering control method controlling a reaction force motor to generate a reaction torque in response to rotation of a steering wheel, the steering control method comprising:
    a condition determination step determining whether a stop reaction force providing condition is met, the stop reaction force providing condition including a preset vehicle stop condition and reaction force provision preparation condition;
    an information production step discerning and processing a scheme for producing stop reaction torque information based on remaining power information regarding a remaining power amount of a battery supplying power to the reaction force motor upon determining that the stop reaction force providing condition is met; and
    a stop reaction force control step controlling to generate a stop reaction torque to the steering wheel based on the stop reaction torque information.

11. The steering control method of claim 10, wherein the vehicle stop condition is set as a condition meeting at least one of a condition where an ignition off of a vehicle is complete, a condition where a power off of the steering device is complete, or a condition where velocity information about the vehicle is determined to be less than a preset reference velocity, and the reaction force provision preparation condition is set as a condition meeting at least one of a condition where steering torque information is determined to be a reference torque or more, a condition where a car key is recognized as being inserted in the vehicle, a condition where a door of the vehicle is recognized as open, or a condition where a person is recognized as being in the vehicle, and wherein the condition determination step determines that the stop reaction force providing condition is met when both the vehicle stop condition and the reaction force provision preparation condition are met.

12. The steering control method of claim 10, wherein if the remaining power information is determined to be a preset reference power amount or more, the information production step produces steering angle displacement information based on steering angular velocity information and produces the stop reaction torque information so that a magnitude of the stop reaction torque information increases as a magnitude of the steering angle displacement information increases, and wherein if the steering angle displacement information is a preset reference steering angle displacement or more, the information production step produces a preset maximum reaction torque as the stop reaction torque information.

13. The steering control method of claim 10, wherein if the remaining power information is determined to be less than a preset reference power amount, the information production step produces the stop reaction torque information based on a preset motor braking torque.

14. The steering control method of claim 10, wherein if the remaining power information is determined to be a preset reference power amount or more so that the stop reaction torque information is produced, the stop reaction force control step controls to drive the reaction force motor to generate a torque corresponding to the stop reaction torque information.

15. The steering control method of claim 10, wherein if the remaining power information is determined to be less than a preset reference power amount so that the stop reaction torque information is produced, the stop reaction force control step controls a switching element of an inverter to short a motor coil of the reaction force motor.

* * * * *